3,361,535
METHOD FOR PRODUCTION OF HIGH PURITY HYDROGEN
Ernest L. Pollitzer and Vladimir Haensel, Hinsdale, Ill., assignors to Universal Oil Products Company, Des Plaines, Ill., a corporation of Delaware
Filed Jan. 29, 1964, Ser. No. 341,061
5 Claims. (Cl. 23—212)

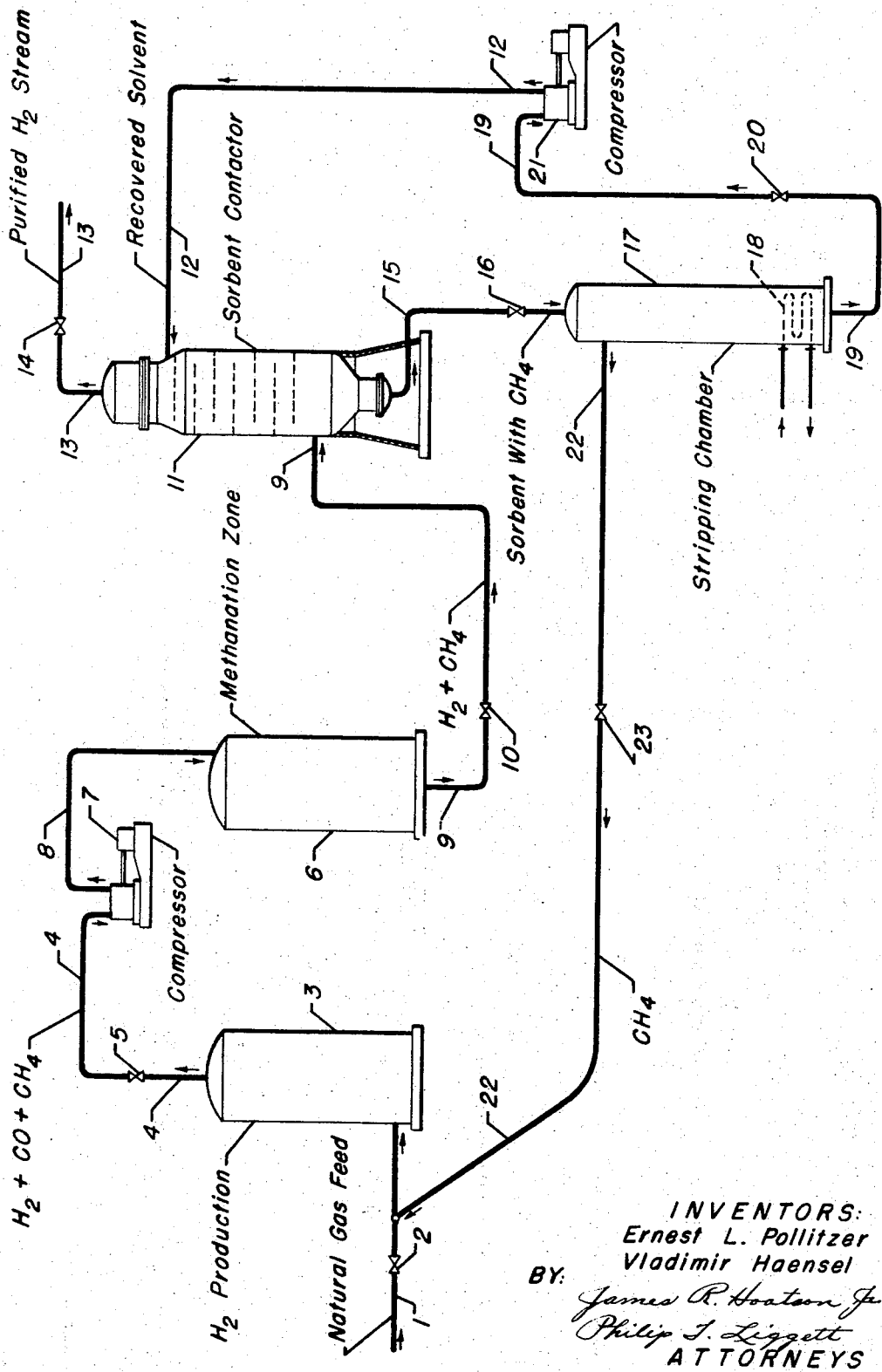

ABSTRACT OF THE DISCLOSURE

Production of hydrogen by cracking of natural gas, contacting the resultant product stream at increased pressure with a hydrogenating catalyst to convert the CO therein to methane, sorbing the latter out of the gas stream in a liquid or solid sorbent at the increased pressure, reducing the pressure on the enriched sorbent and separating the methane therefrom, and supplying the stripped methane to the cracking step.

---

The present invention relates to a method for the production of high purity hydrogen and more specifically to a processing system for hydrogenating or for "methanating" and eliminating the carbon monoxide (CO) contamination in a hydrogen stream produced by the catalytic decomposition of natural gas, methane or other light hydrocarbon feed streams. The terms "methanate," "methanation," etc., as used herein, refer to the hydrogenation of CO to form methane and water.

Hydrogen may be produced in a continuous manner by the use of various methods, as for example, the water-gas reaction or the steam-methane process. However, such methods generate large quantities of carbon oxides and are generally unsatisfactory where hydrogen purity is of importance. The cracking or decomposing of low molecular weight hydrocarbons and in particular methane or natural gas provides an attractive source of hydrogen by producing high yields with less than about 2% carbon oxides in the product stream. Such decomposition is preferably effected at high temperature conditions above about 1400° F. and in the presence of a supporting Iron Group metal catalyst and particularly a nickel catalyst. Actually, careful selection and/or preparation of the catalyst and the control of conversion conditions can provide better than 90% yields of hydrogen and less than 1% of the carbon oxides in the product stream. However, where even this small quantity of CO is objectionable, then the present improved system may be utilized to furnish a high hydrogen purity from a decomposition process.

Briefly, it is an object of the present invention to provide a system which has in combination with a continuous catalytic hydrocarbon decomposition unit, a catalytic methanating stage to convert residual CO in the product stream and, in addition, which incorporates a separate stage whereby entrained methane can be removed from the treated product stream to provide hydrogen with the desired high purity.

It is also an object of the present invention to provide means for both increasing and decreasing the pressure of the product stream in connection with a solid adsorbent or solvent extraction portion of the processing system in order to increase the efficiency of the methane-hydrogen separation.

A still further object of the invention is to provide for recycling or returning the methane separated from the product stream to the hydrocarbon decomposition zone for methane cracking therein.

In a broad aspect, the present invention provides a method for producing a hydrogen stream of high purity in the manner which comprises, passing a normally gaseous hydrocarbon charge stream at a pressure of less than 50 p.s.i.g., into contact with a decomposition catalyst in a reaction zone maintained at a decomposition temperature of above about 1400° F. and effecting the conversion thereof to a product stream containing primarily hydrogen and carbon together with minor amounts of carbon monoxide and unconverted methane, subjecting such resulting product stream from the reaction zone to an increase in pressure above about 300 p.s.i.g. and passing it to a methanation zone and therein contacting such stream with a hydrogenation catalyst at methanating conditions effecting the conversion of the carbon monoxide content of such stream in the presence of hydrogen to form methane and water, discharging the resulting carbon monoxide free product stream from the methanation zone and passing it at an elevated pressure to a separation zone, introducing a sorbent stream into such separation zone and effecting an adsorption of methane therein, discharging a desired substantially pure hydrogen stream and a methane-containing sorbent stream from said separation zone, passing the latter stream into a reduced pressure sorbent recovery zone and effecting the separation of dissolved methane therefrom as a gaseous phase, and returning the resulting stripped sorbent stream to said separation zone at an elevated pressure.

As noted hereinbefore, and in accordance with a preferred operation, there is utilized a recycling of methane back to the hydrocarbon decomposition stage. Such recovered methane results from both the methanating of CO and from the failure of the charge stream to be entirely converted to hydrogen and carbon.

Thus, in a somewhat more specific embodiment of the invention, there is provided an improved system for producing a hydrogen stream of high purity in a manner which comprises passing a natural gas charge stream at a pressure of less than 50 p.s.i.g., together with recovered methane obtained as hereinafter set forth, into contact with a decomposition catalyst in a reaction zone maintained at a decomposition temperature of above about 1400° F. and effecting the conversion thereof to a product stream containing primarily hydrogen and carbon together with minor amounts of carbon monoxide and unconverted methane, subjecting the resulting product stream from the reaction zone to an increase in pressure above about 300 p.s.i.g., and then passing it to a methanation zone and therein contacting such stream with a hydrogenation catalyst at methanating conditions effecting the conversion of the carbon monoxide content of such stream in the presence of hydrogen to form methane and water, discharging the resulting carbon monoxide free product stream from the methanation zone and passing it at an elevated pressure above about said 300 p.s.i.g. to a pressurized separation zone, introducing a liquid solvent stream into such separation zone and effecting a sorption of methane therein, discharging a desired substantially pure hydrogen stream and a methane-containing solvent stream from said separation zone, passing the latter stream into reduced pressure solvent recovery zone and effecting the separation of dissolved methane therefrom as a gaseous phase, returning the resulting stripped liquid solvent stream to said separation zone at an elevated pressure sufficient for introduction thereto and passing the separated gaseous methane from said recovery zone to first said reaction zone as said recovered methane being introduced thereto along with the gaseous charge stream.

The catalytic decomposition reaction step is preferably carried out in a fluidized system, although it may be effected in various ways, as, for example, one other method may comprise locating the decomposition catalyst composite in a fixed bed within a reactor. In this type of operation, the hydrocarbon charge is periodically alternated with a flow of air or other oxygen-containing gas to effect a controlled oxidation of the carbon deposits on the catalyst composite. In a moving bed method of operation, there may be utilized a separate reactor and regenerator whereby the catalyst composite, in pellet or particle form, is continuously passed through the reactor either concurrently or countercurrently with respect to the hydrocarbon charge stream, whereby to effect an efficient contacting between the catalyst and the gaseous charge stream. The catalyst is continuously circulated from the reactor to a regenerator, as well as from the regenerator to the reactor, such that an oxygen-containing gas may effect the burning and carbon removal from the catalyst being introduced into the regeneration zone. Resulting hot regenerated catalyst is thus circulated to the reactor to effect contact with further quantities of the hydrocarbon charge.

As indicated hereinbefore, the generally preferred continuously operating system utilizes fluidized contacting, where the hydrocarbon charge is passed either concurrently or countercurrently with respect to a finely divided catalytic material so as to effect an efficient turbulent contacting and intermingling with the catalyst particles. Here, again, separate reaction and regeneration zones are used such that carbonized catalyst particles may be continuously withdrawn from the reaction zone to pass into a separate regeneration zone for contact with air or other oxygen-containing streams and whereby resulting hot regenerated substantially carbon free catalyst particles may be withdrawn from the regenerator and returned to the reactor.

The Iron Group metals of the Periodic Table are generally disclosed and used as the activating components of a catalyst to carry out the decomposition step, and of the Iron Group metals, it is found that nickel is the preferred catalytic component. The metal component may be composited with alumina, or other suitable supporting material, to provide the desired catalyst particles. In the moving bed type of operation, the particles may be of the pellet or marble size, while in connection with the fluidized system, the particles are necessarily prepared to be of a finely divided nature whereby they may be readily transported in an aerated and fluidized manner. For example, finely divided micro-spherical support particles, which have been formed by dropping gel droplets into oil or by spray drying a slurry feed, can be soaked or othewise impregnated in a solution of a suitable compound of the selected metal. Alternatively, the nickel or other active component may be added directly to the hydrogel slurry feed to the spray dryer such that it is automatically incorporated in the formed microsphere. Suitable compounds may include nickel nitrate, nickel sulfate, nickel chloride, nickel bromide, nickel fluoride, nickel iodide, nickel acetate, nickel formate, or ferric chloride, ferric bromide, ferric fluoride, ferric nitrate, ferric sulfate, etc. The impregnated composite may be dried in an oxygen atmosphere or in a reducing atmosphere. Various supporting materials, in addition to the alumina, may comprise other inorganic oxides, as, for example, silica, thoria, zirconia, beryllia, titania, etc. Such additive support metals may or may not contribute to the catalytic activity of the composite; however, such additives may provide additional strength or other desired physical characteristic.

Preferably, the hydrocarbon decomposition reaction is carried out at high temperatures above normal gas-oil cracking temperatures, such that the preferred range is above 1400° F. and generally in the range of 1500° to 1800° F. The regeneration temperature may be carried out at a still slightly higher temperature range, such that the catalyst being returned to the reaction zone carried endothermic heat for the hydrocarbon cracking or decomposition. Generally, the pressure will be relatively low, say less than about 50 p.s.i.g. Particularly in a fluidized system, there are advantages to operating at a relatively low pressure, although low pressure favors the decomposition reaction irrespective of the system used.

The product stream from the decomposition zone, carrying minor quantites of CO and unreacted methane, in accordance with the present improved system, is compressed and elevated in pressure to above about 300 p.s.i.g. prior to being passed into a CO hydrogenating or methanating zone. The methanating step, embodying the reaction:

$$CO + 3H_2 = CH_4 + H_2O$$

is preferably carried out in a fixed bed system to effect the desired catalyst contacting. Various hydrogenation or synthesis catalyst comprising iron, nickel, or more particularly metals of the Iron and Platinum Groups may be used to effect the CO methanation; however, it appears that a nickel containing catalyst is preferred to obtain the maximum conversion to methane. Various promoting agents or metallic hydrogenating components, other than nickel, but to be used in combination therewith may comprise oxides of copper, cobalt, molybdenum, chromium, etc. Here, again, the active metal component, or components, may be supported on a suitable inorganic carrier material such as alumina or alumina with silica, zirconia, thoria, ceria, beryllia, vanadia, etc. Certain of the latter may also have a catalytic or promoter effect in assisting in the methanation step.

The reaction temperature in the methanation zone is generally below 1000° F. and more particularly in the 300° F. to 800° F. temperature range. The pressure may be relatively low, particularly in the presence of an active hydrogenation catalyst; however, increasing pressure to the order of 150 to 200 p.s.i.g. or more does favor methane formation and where a fixed bed reactor unit is utilized, the pressure may be readily elevated to this level. The methanation step is exothermic; however, temperature control in the reaction zone may be in turn controlled by the method of introducing the hydrogen product stream into the bed. Contacted catalyst particles in any one reactor may be periodically subjected to carbon removal by treatment with an air or oxygen containing stream, with multiple reactors being used in a fixed bed contacting system to permit the use of a swing reactor.

With respect to the hydrogen-methane separation stage, following the carbon monoxide methanation step, there may be various methods utilized. For example, the mixed product stream from the methanating reactor can be carried at the elevated pressure level to a separation zone and therein subjected to a countercurrent solvent extraction type of contacting in a multiple stage type of contactor. Preferably, the solvent extraction is carried out at a high pressure in order to increase gas solubility and to permit the subsequent liberation of dissolved gases from the rich solvent stream by the lowering of pressures in a stripping section. The solvent which is utilized in such a process shall have a low vapor pressure at the temperature of extraction, in addition to having the ability of dissolving methane in preference to hydrogen. Certain paraffinic hydrocarbon solvents may serve as satisfactory sorbent streams, being generally preferable to aromatic hydrocarbons. Still other liquid solvents may include the perfluorocarbons and perchlorocarbons which have the ability to enhance the solubility for paraffins. Thus, the solvent compound may comprise perfluorobutane, perfluoropentane, perfluorohexane, etc.; perchlorobutane, perchloropentane, perchlorohexane, etc.; or the cyclic paraffins, such as perfluorocyclopentane, perfluorocyclohexane, etc., and perfluorobutane, perfluoropentane, perfluorohexane, perfluorocyclopentane, perfluorocyclohexane, etc. Also, mixed paraffin compounds containing both fluorine and chlorine components may be used as desirable solvents. The particular choice of one of these solvents, of course, depends upon the temperature and pressure conditions selected for treating the product stream in the adsorption zone and for effecting the solvent stripping step.

In effecting a solvent extraction type of methane sorption, a multiple stage contacting arrangement such as provided by the teachings of Grunewald et al., U.S. Patent No. 2,647,855, issued Aug. 4, 1953, or by the rotating disc type of contact apparatus described in Reman et al., U.S. Patent No. 2,729,545, issued Jan. 3, 1956, will be of particular advantage. In any event, it is not intended to limit the combined processing system to the utilization of any one type of separation step. It should be understood that the separation may be carried out by any suitable solvent extraction type of operation or a fractional distillation arrangement including the combination of adsorption and compression zones carried out at temperatures and pressures to enhance the separation of methane from the hydrogen.

Still another suitable separation step may comprise the use of a solid adsorbent, which may be of the molecular sieve type or any suitable adsorbent for hydrocarbons, whereby methane is selectively adsorbed from the hydrogen product stream. The use of a solid sorbent material in subdivided form is not materially different from that encountered in a liquid solvent extraction operation in that the sorbent material is permitted to contact the product stream in a countercurrent flow and the resulting rich sorbent stream is carried to a suitable stripping zone such that the adsorbed component may be removed and the resulting lean sorbent stream can be returned to the adsorption zone.

A reference to the accompanying drawing and the following description thereof will serve to present one arrangement or embodiment of the improved combined processing system for producing a substantially pure hydrogen product stream and, at the same time, additional advantageous features in connection with the present combined system may be noted.

The hydrocarbon charge stream, which, for example, may be a natural gas feed comprising of the order of 85% methane, is introduced by way of line 1 and control valve 2 to a hydrogen producing zone 3. The latter zone is indicated diagrammatically only, but will comprise a catalytic decomposition reactor capable of producing a high yield of hydrogen with a minimum of carbon oxides formation under high temperature conditions well above the normal gas-oil cracking temperatures. In other words, the methane in the natural gas feed stream may be converted in the presence of an aluminum-nickel catalyst at a temperature of above 1400° F. to provide decomposition of the methane into hydrogen and carbon. A preferred continuous hydrogen producing zone will utilize a moving bed or a fluidized bed type of operation such that there is a continuous production of hydrogen and continuous carbon removal of coke from the catalyst in an oxidizing or regenerating zone, as described hereinbefore.

The hydrogen product stream, together with a small percentage of unreacted methane and a small percentage of carbon oxides, principally carbon monoxide, is indicated as being discharged from the hydrogen producing zone 3 by way of line 4 and control valve 5 to be introduced into a compressor 7 and then by way of line 8 into the hydrogenation or methanation zone 6. In this latter zone, the carbon monoxide content of the product stream is preferentially converted to methane by contacting a suitable hydrogenation catalyst at a temperature in the range of from about 300° to 800° F. and at an elevated pressure above about 300 p.s.i.g. Here, again, the catalyst may comprise alumina with 5% to 15% nickel or alumina-nickel with an additive component of chromia or as a small percentage of copper. Also, a preferred methanation step embodies a continuously operating unit which utilizes at least two reactors, such that at least one catalyst containing reactor is in operation to provide for the carbon monoxide conversion to methane in a continuous manner, while simultaneously the alternate reactor is undergoing regeneration of contacted catalyst particles.

The resulting product stream from the methanation zone 6, substantially free of carbon monoxide, is discharged by way of line 9 and control valve 10, while still at an elevated pressure to be introduced into a sorbent contacting chamber 11. The latter may, for example, comprise a chamber, with multiple countercurrent contacting stages, and be designed to receive and redistribute an overhead solid sorbent or a liquid solvent by way of line 12. The resulting countercurrent contact between the rising gaseous product stream and the descending sorbent stream thus provides for the overhead discharge of a substantially pure methane and carbon monoxide-free hydrogen stream by way of line 13 and control valve 14.

At the same time, an enriched solvent stream is withdrawn from the lower end of the contactor 11 by way of line 15 having control valve 16 to be introduced into a suitable stripping chamber 17. As indicated hereinbefore, it is not intended to limit the present process to the use of any one sorbent or solvent stream in connection with the hydrogen-methane separation stage; therefore, for illustrative purposes in the drawing, there is indicated a liquid solvent, which may be a perfluorocarbon such as, for example, perfluorohexane, that is introduced by way of line 12 at a pressure above the 300 p.s.i.g. or more maintained in chamber 11. Although not shown in the drawing, additional compressor means may be provided in the feed line ahead of the contactor 11 to obtain a higher pressure than maintained in the methanation zone 6. The rich solvent stream passing between contactor 11 and stripping chamber 16 is decreased in pressure through release valve 16, such that there is a decompression and flashing to assist in the methane removal and stripping of the solvent. There is also indicated in combination with the stripping chamber 17 a heating coil 18 suitable to assist in maintaining a controlled stripping temperature within chamber 17. The resulting stripped methane-free lean solvent is discharged from the lower end of the stripping chamber 16 by way of line 19 and control valve 20 to be again elevated in pressure by a suitable compressor means 21, such that the solvent may then be reintroduced into the contactor 11 by way of the feed line 12.

The methane stripped from the solvent in stripping chamber 17 is collected and discharged therefrom by way of line 22 and control valve 23 to be returned to the feed line 1 and the hydrogen producing zone 3. Thus, the present processing scheme makes use of the converted carbon monoxide to produce additional methane which may be utilized in the hydrocarbon decomposition zone to in turn produce greater yields of hydrogen and carbon. It may also be pointed out in connection with the hydrogen-methane separating step that the sorbent material or solvent stream shall selectively absorb the methane portion of the product stream; however, a certain amount of hydrogen solubility may be tolerated inasmuch as the gaseous medium phase being separated from the enriched sorbent stream in stripping chamber 17 is returned by way of line 22 back to the hydrogen producing zone and a small quantity of hydrogen being returned thereto with the methane stream is not lost from the hydrogen producing system.

It may be further pointed out that there is generally no economical loss involved in effecting the compression of the product stream leaving the methanation zone 6 and entering the separation stage, inasmuch as it is generally desirable to have a high pressure hydrogen stream discharged from the system.

We claim as our invention:

1. A method for producing a hydrogen stream of high purity from the decomposition of a hydrocarbon charge stream, which comprises, passing a normally gaseous hydrocarbon charge stream at a pressure of less than 50 p.s.i.g. into contact with a decomposition catalyst in a decomposition reaction zone maintained at a temperature of above about 1400° F. and effecting the conversion thereof to a gaseous product stream containing primarily hydrogen together with minor amounts of carbon monoxide and unconverted methane, subjecting the resulting product stream from the decomposition reaction zone to an increase in pressure above about 300 p.s.i.g. and passing it to a methanation zone and therein contacting such stream with a hydrogenation catalyst at methanating conditions, effecting the conversion of the carbon monoxide content of such stream in the presence of hydrogen to form methane, discharging the resulting carbon monoxide free product stream from the methanation zone and passing it at an elevated pressure to a separation zone, introducing a sorbent stream into such separation zone and effecting an adsorption of methane therein, discharging a desired substantially pure hydrogen stream and a methane-containing sorbent stream from said separation zone, passing the latter stream into a reduced pressure sorbent recovery zone and effecting the separation of dissolved methane therefrom as a gaseous phase, and returning the resulting stripped sorbent stream to said separation zone at an elevated pressure.

2. A method for producing a hydrogen stream of high purity from the decomposition of a hydrocarbon charge stream, which comprises, passing a normally gaseous hydrocarbon charge stream at a pressure of less than 50 p.s.i.g., together with recovered methane obtained as hereinafter set forth into contact with a decomposition catalyst in a reaction zone maintained at a decomposition temperature of above about 1400° F. and effecting the conversion thereof to a gaseous product stream containing primarily hydrogen together with minor amounts of carbon monoxide and unconverted methane, subjecting the resulting product stream from the reaction zone to an increase in pressure above about 300 p.s.i.g. and then passing it to a methanation zone and therein contacting such stream with a hydrogenation catalyst at methanating conditions effecting the conversion of the carbon monoxide content of such stream in the presence of hydrogen to form methane, discharging the resulting carbon monoxide-free product stream from the methanation zone and passing it at an elevated pressure above about 300 p.s.i.g. to a separation zone, introducing a sorbent stream into such separation zone and effecting sorption of methane therein, discharging a desired substantially pure hydrogen stream and a methane-containing sorbent stream from said separation zone, passing the latter stream into a reduced pressure sorbent stripping zone and effecting the separation of methane therefrom as a gaseous phase, returning the resulting stripped sorbent stream to said separation zone at a required elevated pressure level, and passing the separated gaseous methane from said recovery zone to first said reaction zone as said recovered methane being introduced thereto along with said gaseous hydrocarbon charge stream.

3. A method for producing a hydrogen stream of high purity from the decomposition of a hydrocarbon charge stream, which comprises, passing a normally gaseous hydrocarbon charge stream at a pressure of less than 50 p.s.i.g., together with recovered methane obtained as hereinafter set forth, into contact with a decomposition catalyst in a decomposition reaction zone maintained at a temperature of above about 1400° F. and effecting the conversion thereof to a gaseous product stream containing primarily hydrogen together with minor amounts of carbon monoxide and unconverted methane, subjecting the resulting product stream from the decomposition reaction zone to an increase in pressure above about 300 p.s.i.g. and passing it to a methanation zone and therein contacting such stream with a hydrogenation catalyst at methanating conditions effecting the conversion of the carbon monoxide content of such stream in the presence of hydrogen to form methane, discharging the resulting carbon monoxide free product stream from the methanation zone and passing it at least at the pressure of the discharge therefrom to a separation zone, introducing a liquid solvent stream into such separation zone and effecting a sorption of methane therein, discharging a desired substantially pure hydrogen stream and a methane-containing solvent stream from said separation zone, passing the latter stream into a reduced pressure solvent recovery zone and effecting the flashing and separation of dissolved methane therefrom as a gaseous phase, returning the resulting stripped liquid solvent stream to said separation zone at an elevated pressure, and passing the separated gaseous methane from said recovery zone to first said reaction zone as said recovered methane being introduced thereto along with said gaseous hydrocarbon charge stream.

4. The method of claim 3 further characterized in that said liquid solvent stream is selected from the group consisting of paraffinic hydrocarbons, paraffinic perfluorocarbons, perchlorocarbons and mixtures thereof.

5. A process for producing hydrogen which comprises cracking a normally gaseous hydrocarbon at a pressure below 50 p.s.i.g., thereby forming a CO-containing hydrogen stream, increasing the pressure on said stream to above 300 p.s.i.g. and reacting the carbon monoxide with a portion of the hydrogen to form methane, contacting the resultant methane-containing hydrogen stream with a sorbent for methane at a pressure above 300 p.s.i.g. to separate the methane from the hydrogen, recovering the thus purified hydrogen, reducing the pressure on the methane-enriched sorbent and stripping the methane from the sorbent, and supplying the stripped methane to the aforesaid cracking step.

References Cited

UNITED STATES PATENTS

| | | |
|---|---|---|
| 2,799,640 | 7/1957 | Pevere et al. |
| 2,882,243 | 4/1959 | Milton _____ 23—112 X |
| 3,057,689 | 10/1962 | McEvoy et al. _____ 23—212 |
| 3,120,431 | 2/1964 | Carton et al. _____ 23—212 X |
| 3,188,179 | 6/1965 | Gorin _____ 23—212 |
| 3,251,652 | 5/1966 | Pfefferle _____ 23—212 X |

MILTON WEISSMAN, *Primary Examiner.*

EDWARD STERN, *Assistant Examiner.*